UNITED STATES PATENT OFFICE.

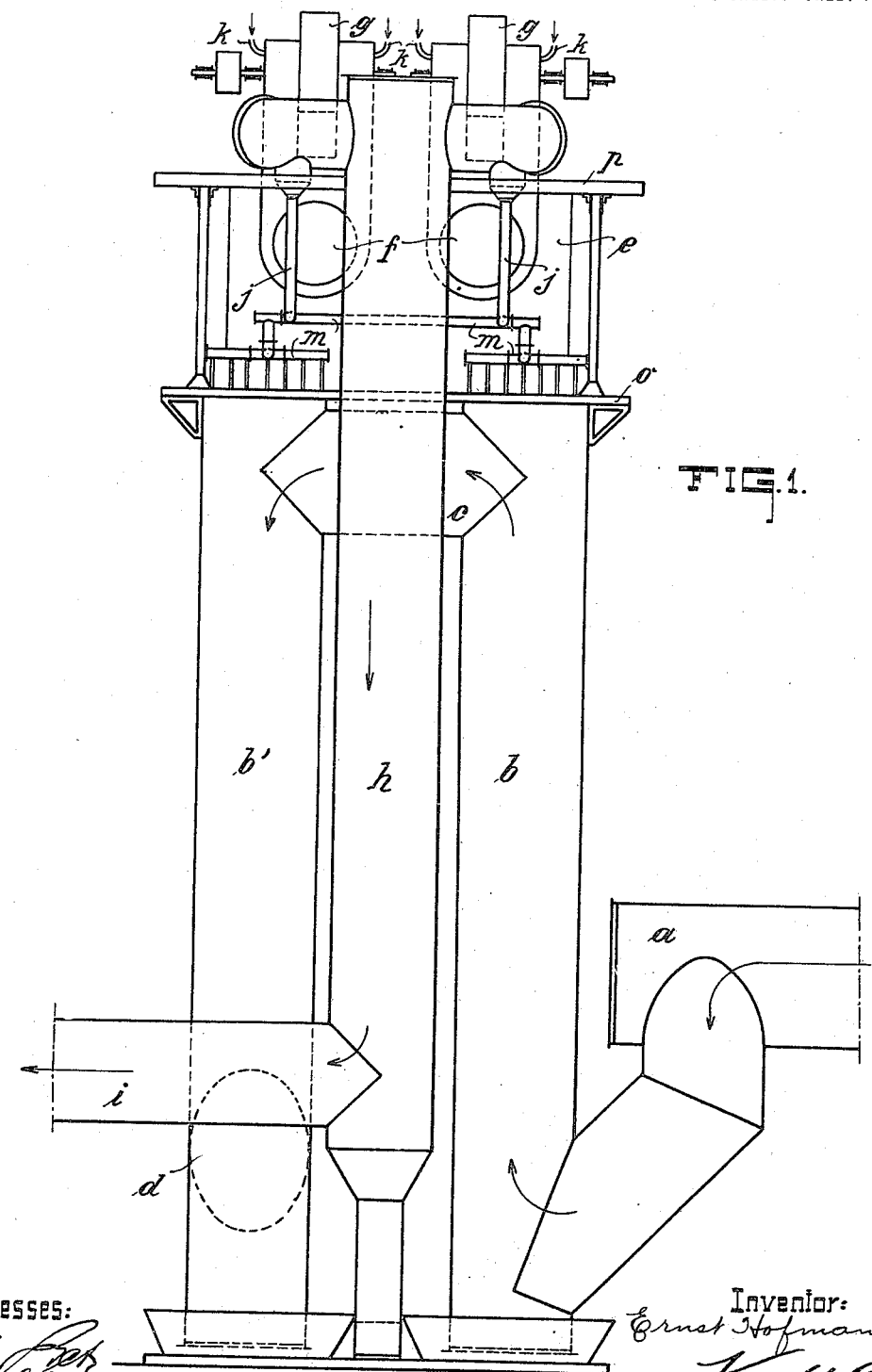

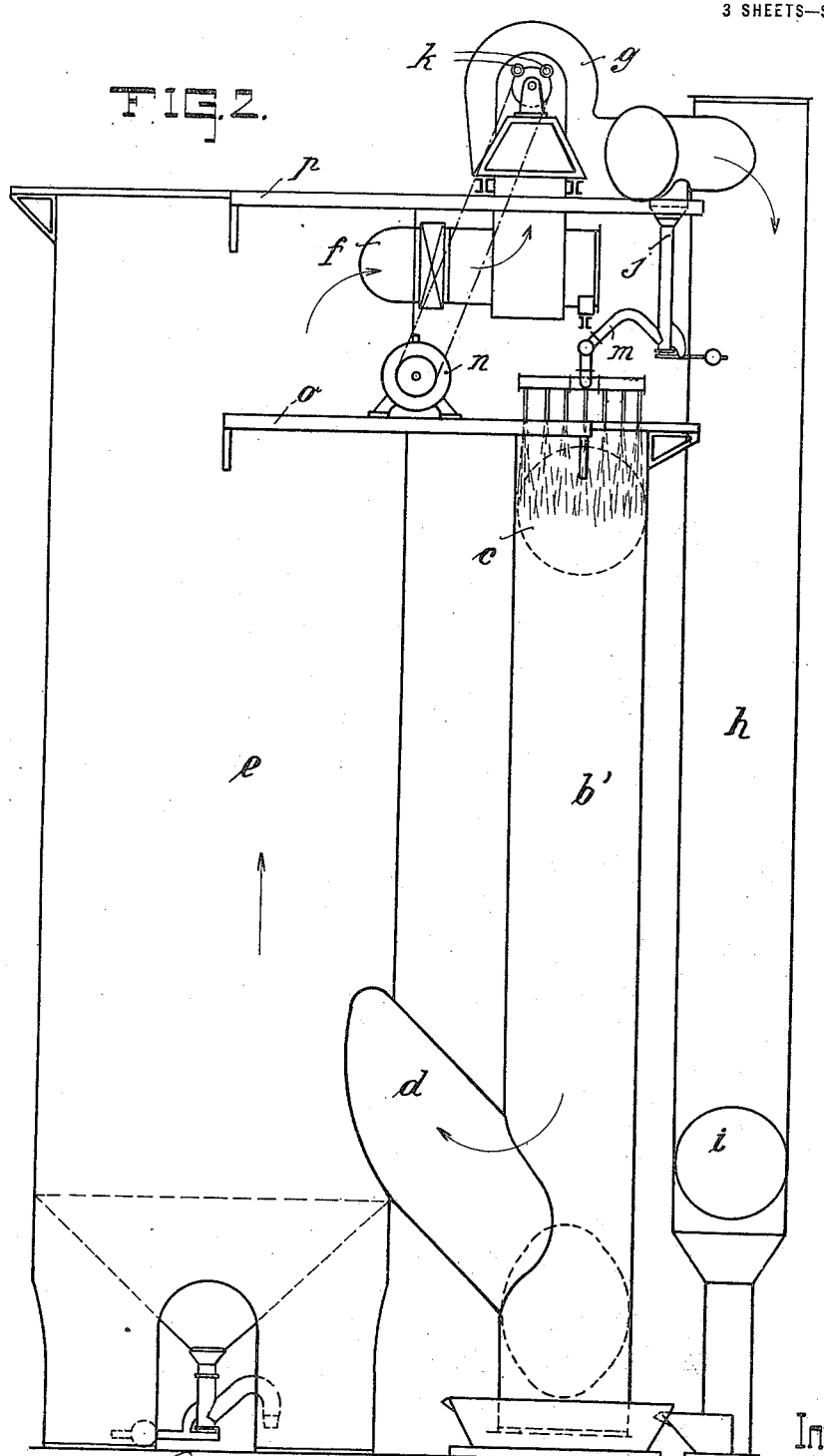

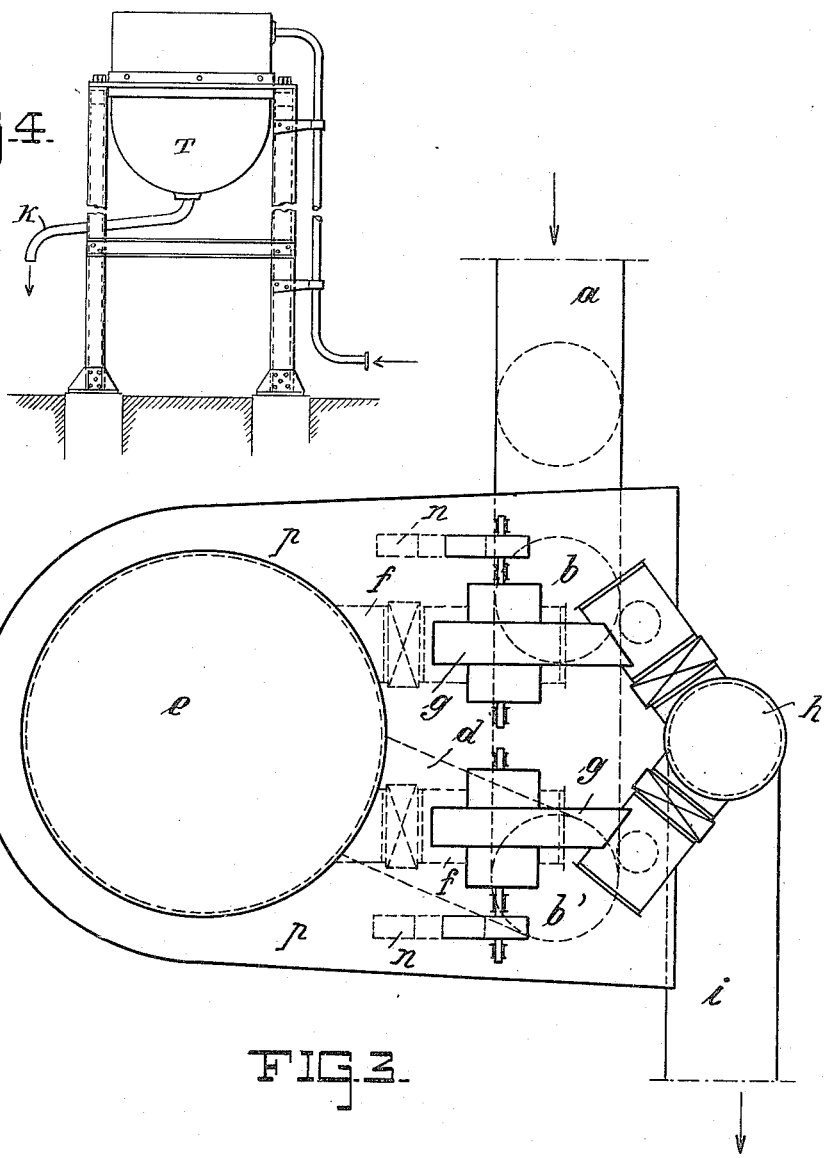

ERNST HOFMANN, OF DUISBURG-MEIDERICH, GERMANY.

APPARATUS FOR COOLING AND PURIFYING FURNACE-GASES.

1,155,237.     Specification of Letters Patent.     Patented Sept. 28, 1915.

Application filed November 7, 1913. Serial No. 799,776.

*To all whom it may concern:*

Be it known that I, ERNST HOFMANN, a subject of the Emperor of Germany, residing at Duisburg-Meiderich, Germany, have invented certain new and useful Improvements in Apparatus for Cooling and Purifying Furnace-Gases, of which the following is a specification.

In known arrangements for purifying and cooling the waste gases from blast furnaces and the like which are worked on the principle of wet purification, a fixed quantity of water is necessary for cooling and purification. This quantity of water is composed of the amount required by the coolers (the preliminary scrubbers) and that required by the purifying apparatus which effects the final purification and is at present constructed as rotating purifiers. Since the pumping plant belonging to the purifying plant must be proportioned according to the consumption of water, it is important, in order to economize in the cost of the plant and the working thereof, to keep the consumption of the water as low as possible.

According to the present invention it is intended to achieve this by arranging the rotating purifiers, which serve to purify the gas to the desired degree of purity, in such a vertical position or at such an elevation, that the water, which has been used in these purifiers, flows to the coolers by gravity so that it can be utilized in them directly. This affords a considerable economy in space occupied, in comparison with the hitherto usual arrangement of erecting the rotating purifiers alongside the coolers on the ground. Furthermore, by this method of construction, a simplification of the whole plant is obtained, as for instance by the abolition of long connecting pipes with their supports between the coolers and the rotating purifiers; reduction in size of the pumping plant caused by the reduced consumption of water; abolition of the housing over the rotating purifiers; and a considerable economy is secured in the cost of the plant in comparison with the arrangement hitherto usual.

One embodiment of the invention is illustrated diagrammatically in the accompanying drawings, wherein:

Figure 1 is a front elevation, Fig. 2 a side elevation and Fig. 3 a plan of the combined purifying plant, and Fig. 4 is a side view of the elevated water tank.

The crude gas supplied for purification passes through a pipe $a$ near the base of the apparatus into a preliminary cooler $b$, composed as illustrated of a vertical tubular column closed at the top and standing in a water bath, then from there, in the direction of the arrow, through a connecting pipe $c$ into the upper end of a second similarly shaped and arranged cooler $b^1$ and thence through a pipe $d$ at the lower end of the cooler $b^1$ into a cooler $e$. This cooler $e$, covered on top and provided with suitable draining device at the bottom is also cylindrical, but of considerably greater diameter and somewhat longer than the coolers $b$ and $b^1$. The axes of all three coolers are vertical. Rotating purifiers $g$ mounted on a platform $p$ at the top or upper part of the apparatus take the crude gases through pipes $f$ from the cooler $e$, purify them to the desired degree of purity and force them through pipes $h$, $i$ to the points of consumption (such as steam boilers, air heaters, etc.). The platform $p$ is supported by the cooler $e$.

In all the coolers, the gas flowing through them comes into contact with trickling water, whereby it is cooled and the coarser substances admixed therewith precipitated, which substances are then carried away with the water that runs off to the clearing or settling plant. The water required in the cooler $e$ is taken direct from an elevated tank T and no further use is made of it after it has quitted the cooler $e$, it being delivered immediately to the settling tank. The water however required for the preliminary coolers $b$, $b^1$ has first passed through rotating purifiers $g$ on its way from the aforesaid elevated tank to the preliminary coolers $b$, $b^1$, and has served for the fine scrubbing therein prior to being further used for the preliminary cooling and the coarse purification. This water is supplied from tank T to the fine purifiers at $k$, taken therefrom again at $j$ and distributed to the preliminary coolers $b$, $b^1$ through the pipes $m$.

The driving motors $n$, which are generally electric motors, are here mounted upon a platform $o$, which is supported by the three coolers $b$ $b^1$ and $e$ underneath the platform $p$ and drive the rotating purifiers by means of belts. The motors may however instead be located on the platform $p$ and directly coupled to the rotating purifiers $g$ or otherwise arranged at any desired point.

Instead of connecting the rotating purifiers $g$ directly to the preliminary coolers, the arrangement may be so constructed that the rotating purifiers may be separated by a space from the preliminary coolers and only connected to them by pipes for gas and water, and mounted on a special framework such for example as the framework of a blast or other furnace situated in the vicinity; only care must be taken that the outlet opening for the water flowing from the rotating purifiers is located at a suitable height above the preliminary coolers.

Claims.

1. Apparatus for cooling and purifying furnace gases having a plurality of intercommunicating cooling cylinders, connected in series, a spraying device for said cylinders and a finishing purifier connected with the cooling cylinder last in the series; a conduit for admitting cooling medium under pressure into said purifier and pipe connection between said purifier and said spraying device; said medium first passing through said purifier and thereupon as fine spray through said cooling cylinders.

2. Apparatus for cooling and purifying furnace gases having a plurality of intercommunicating cooling cylinders, connected in series, a spraying device for said cylinders and a plurality of finishing purifiers connected with the cooling cylinder last in the series; a conduit for admitting cooling medium under pressure into said purifiers and pipe connection between said purifiers and said spraying device; said medium first passing through said purifiers and thereupon as fine spray through said cooling cylinders.

3. An apparatus for cooling and purifying furnace gases, having a first, a second and a third upright cooling cylinder, rotating finishing purifiers adjacent the top of said cylinders; a conduit for admitting the gases from the furnace at the lower end of the first cylinder, conduits between the upper ends of the first and second cooling cylinders, and between the lower ends of said second and third cooling cylinders, conduits between the upper end of said third cylinder and said purifiers; a water tank above said purifiers and pipe connections from said tank to the purifiers; a sprinkling device at the top of each cooling cylinder; pipe connection from said purifiers to the sprinklers of the first and second cooling cylinders and other pipe connection from said water tank to the sprinkler of said third cooling cylinder.

The foregoing specification signed at Barmen, Germany this 17th day of October, 1913.

ERNST HOFMANN. [L. S.]

In presence of two witnesses:
HELEN NUFER,
ALBERT NUFER.